Oct. 31, 1967  R. D. ERICKSON  3,350,604
FLASH LAMP CONTROLLED BY PHOTOSENSITIVE LIGHT
INTEGRATING DEVICE
Filed June 1, 1965

INVENTOR.
ROGER D. ERICKSON
BY Arthur H. Swenson
ATTORNEY.

United States Patent Office 3,350,604
Patented Oct. 31, 1967

3,350,604
FLASH LAMP CONTROLLED BY PHOTOSENSITIVE LIGHT INTEGRATING DEVICE
Roger D. Erickson, Littleton, Colo., assignor to Honeywell Inc., Minneapolis, Minn., a corporation of Delaware
Filed June 1, 1965, Ser. No. 460,013
1 Claim. (Cl. 315—151)

ABSTRACT OF THE DISCLOSURE

Photographic flash apparatus which automatically terminates the flash when a predetermined quantity of light is received from the subject being photographed. A semi-conductor photocell receives the light from the subject and produces a signal representative of the integral of the received light. This signal triggers a trigger circuit when a predetermined signal level is reached. This fires a quench tube connected in parallel with the flash tube, thereby terminating the flash. An adjustable light source for the photocell permits the adjustment of the effect of ambient light on the photocell response.

---

This invention relates to electronic apparatus, and more particularly, to electronic photo flash apparatus.

In the art of photography, cameras and the like have been provided with automatic exposure control means. These means, however, respond only to light which has a persistency which is long compared to the shortest shutter speed available on the camera. The light may be natural or artificial. One form of artificial light which has come into wide use is the so-called electronic flash devices. In such devices, a relatively high voltage charge is stored on a capacitor. Then, at the instant of the taking of a picture, that capacitor is discharged through a gas filled flash tube to provide the desired light. Subsequent to the taking of the picture, a new charge is established and stored on the capacitor in readiness for the next flash discharge through the flash tube. The light flashes produced in such apparatus are normally of extremely short duration, on the order of one millisecond. The automatic exposure control devices heretofore provide for cameras and the like have operated to control either the lens diaphragm opening or the shutter speed or both. When the long persistence light is used, the controlled mechanism sets the desired condition into the camera prior to or during the actual taking of the picture. Such electrical-mechanical systems obviously would not be able to respond fast enough to control the amount of light falling on the film when an electronic flash device is used as the principle light source. Such flash light sources ordinarily produce repeated flashes of light, each with the same light energy content. With such electronic flash light sources, the light falling on the film is controlled by adjusting the camera lens diaphragm. Such an arrangement does not lend itself well to instantaneous automatic exposure control.

It is accordingly an object of the present invention to provide an improved automatic flash exposure control apparatus.

It is a further object of the present invention to provide means for controlling the light energy produced by the electronic flash light source with compensation for the effect of available ambient light.

It is another object of the present invention to provide, in an electronic flash apparatus, means for compensating the time duration of the flash to overcome the effect of available ambient light.

In accomplishing these and other objects, there has been provided in accordance with the present invention, a control circuit for use with an otherwise conventional electronic photo flash apparatus. The control circuit includes a light controlled electronic switch means for extinguishing the flash in the flash tube prior to the normal termination of the flash. The light from the flash is directed toward an object to be illuminated, such as the subject of a photograph. Light reflected from the object falls upon a light sensitive element to produce an electrical signal corresponding to the light energy falling on the light sensitive element. The electrical signal is integrated during the interval of the flash and, when the integrated value of the electrical signal reaches a predetermined value, corresponding to the proper light exposure on the film, a control pulse is generated which, in turn, initiates a short circuit path around the flash tube, thereby extinguishing the flash substantially at the instant of the generation of the control pulse. Since the light falling on the light sensitive element to produce the control pulse is the light reflected from the object, the object-to-light source distance factor is automatically included in the control function. Therefore, a proper exposure is obtained without the need for adjusting the camera lens diaphragm.

A better understanding of this invention may be had from the following detailed description when read in connection with the accompanying drawing in which.

Figure 1:
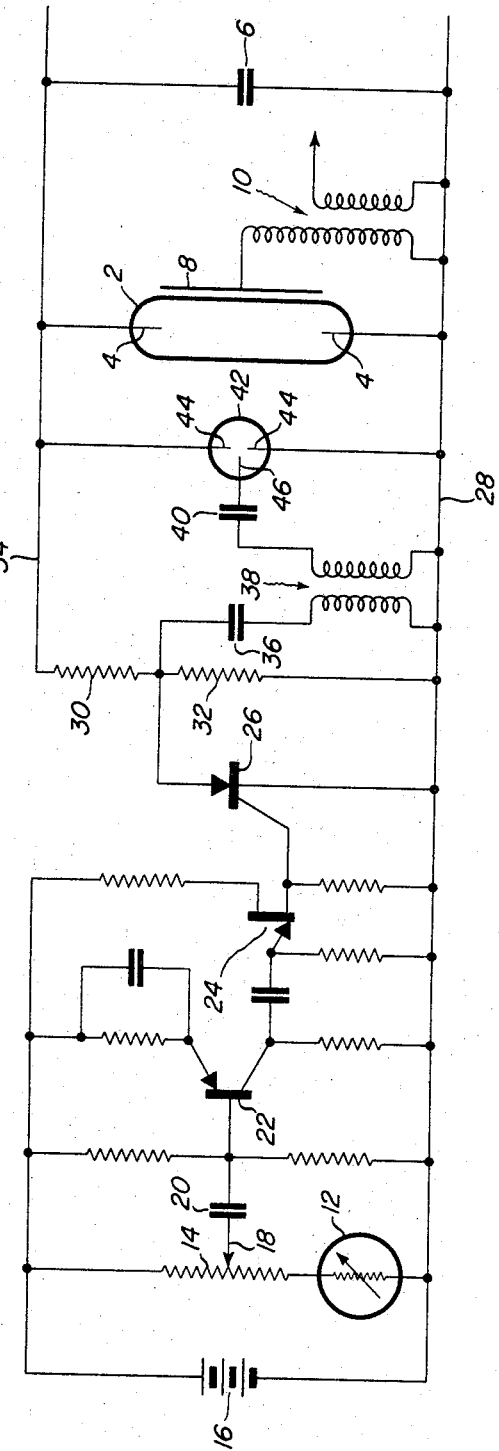
FIG. 1 is a schematic circuit diagram of an electronic flash control system according to the present invention.

Referring now to the drawing in more detail there is shown in FIG. 1 a control circuit for controlling the flash duration of a light flash produced in an electronic photo flash mechanism. A flash tube 2 is provided with a pair of main current conducting electrodes 4. The electrodes 4 are connected, respectively, to opposite electrodes of a main storage capacitor 6. A trigger electrode 8 is positioned adjacent but external to the flash tube 2. The electrode 8 is connected through a trigger transformer 10 to a control switch (not shown) such as the switch associated with the shutter on photographic cameras. The elements thus far described are part of a conventional electronic photo flash apparatus which may, for example, be of the sort shown in the patent to R. D. Kluge No. 3,049,611. In the operation of such flash apparatus, a suitable electronic circuit such as that shown in the Kluge patent establishes a relatively high voltage charge across the storage capacitor 6. The stored voltage also appears across the electrodes 4—4 of the flash tube 2. When it is desired to produce a flash of light from the tube 2, a triggering pulse is produced through the transformer 10 and applied to the trigger electrode 8. That pulse initiates a flash discharge between the electrodes 4 of the tube 2. Under normal operations heretofore, the flash continues until the capacitor 6 has discharged through the tube 2 to the point where the voltage will no longer support the flash across the tube 2. That usually requires about one millisecond of time. According to the present invention the maximum time duration of the flash produced across the tube 2 remains at that time determined by the discharge of the capacitor 6 through the tube 2. However, in order to automatically adjust the flash for those instances wherein the object requires less than the maximum amount of light, a control circuit is provided for extinguishing the flash at some desired point short of the maximum time duration.

In accomplishing the desired quenching of the flash tube, advantage is taken of a charactistic of certain light sensitive semi-conductor elements. Light sensitive semi-conductor elements such as cadmium-sulfide exhibit a unique response characteristic in that the carriers in the semi-conductor elements which provide electrical conductivity are created extremely fast by exposures to light photons. Additional carriers are created as the element is exposed to a continuing light exposure, providing an integral measure of the total light exposure over short enough times. Thus, the light sensitive semi-conductor elements respond very fast to incident light exposures, with the conductivity increasing in relation to the quantity of light falling on the element. However, with sudden decrease in incident light, the conductivity of the semi-conductor material decreases slowly. In other words, the conductivity characteristics of these semi-conductor materials exhibits a fast reaction to light exposure and a slow decay time when the light is removed. With this characteristics, the light sensitive semi-conductor comprises, over relatively short intervals, a non-reactive light integrator. This is in controdistinction to those circuits wherein integration of the light-produced signal is accomplished by a capacitance integrating network, or the like, such as that shown in U.S. Patent No. 3,033,988 issued in the name of H. E. Edgerton. The integrator of the present invention provides several distinct advantages over those shown in the prior art. For example, the capacitance type integrator requires that the dark impedance of the photocell be very high, otherwise the photocell impedance upsets the integration characteristics. In order to achieve the high photocell dark impedance with the required high light sensitivity, the light sensitive element must be a photomultiplier tube. Such tubes require a rather complex power supply. This results in a package which is sufficiently bulky as to preclude its use in portable, camera mounted flash equipment.

The control system of the present invention, on the other hand, is of such simple and compact structure as to render it readily included in camera mounted equipment. An integrator employing a capacitor, but including a semi-conductor light sensitive element, cannot achieve proper integration without cumbersome switching or shutter mechanism for turning the integration device on at the time of the flash. The present invention avoids the need for switches or shutters. It must be remembered, of course, that the term "fast reaction time and slow decay time" is relative. The reaction time and decay time are significant only as they are related to the maximum flash interval. It will be remembered that this flash interval is normally of the order of one millisecond. The significance of this relationship will appear hereinafter.

In practicing this invention a photocell 12 having these characteristics is connected in a series circuit with a variable resistor such as a slidewire resistor 14 and a power supply such as a battery 16. The slider 18, which operates in conjunction with the slidewire resistor 14, is connected through a capacitor 20 to the input circuit of a transistor amplifier including the transistor 22. The output of the amplifier is connected through an RC coupling network to the input circuit of a controlled trigger type transistor 24 such as a unijunction transistor. The output of the unijunction transistor is connected in cascade triggering relationship to the control electrode of a silicon controlled rectifier 26. The cathode of the silicon controlled rectifier 26 is connected to a system common or negative lead 28. The anode of the rectifier 26 is connected to the junction between two serially connected resistors 30 and 32. The remote end of the resistor 32 is connected to the lead 28, while at the remote end of the resistor 30 is connected to a positive lead 34, which carries the positive potential representative of the charge across the main storage capacitor 6. The junction between the resistors 30 and 32 is also connected through a capacitor 36 to the primary winding of a quench trigger transformer 38. The secondary winding of the trigger transformer 38 is connected through an isolating capacitor 40 to the trigger electrode of a specially designed quench or switch tube 42. The main conductive path of the quench tube 42 is connected in shunt with the main conductive path of the flash tube 2.

There are, of course, certain criteria that must be met in the quench tube 42. To operate effectively, the quench tube 42 must have a relatively low impedance compared with the main flash tube 2. A main flush tube has a minimum impedance of typically 1.5 to 2 ohms. Thus, the quench tube should have an impedance near 0.1 ohm. To provide such a low impedance, the tube should have a low gas pressure and a short electrode spacing. The electrodes must be capable of carrying a very high current for a short time. The tube must be capable of being triggered rapidly and easily into conduction over the range of anode voltages used, typically from 100 volts to 500 volts (the range over which the main flash tube voltage changes during the flash). A tube constructed to meet these specifications was provided with a separation between main electrodes 44 of 0.5 cm. and was filled with xenon gas to a pressure of about 100 mm. Hg. The tube includes an internal trigger electrode 46 spaced midway between the two main electrodes 44. In order to accommodate the relatively high current necessary to effect the quench, the main electrodes were made of a doped sintered tungsten. The tube thus constructed was found to be quite satisfactory in operation.

A circuit constructed in accordance with the foregoing description operates as follows. The series circuit including the battery 16, the photocell 12, and the slidewire resistor 14 constitutes the initial detecting circuit for the light reflected from the object to be photographed. The voltage signal appearing at the slider 18 is a function of the division of voltage across the resistance of the slidewire resistor 14 and the resistance of the photocell 12. This voltage will be stabilized at some value for various conditions of ambient or persistent light. Then, when the flash of light is reflected onto the photocell 12 from the object being photographed, the resistance of the photocell decreases rapidly following the incident flash of light. Since the decay time of the conductivity of the photocell 12 is slow relative to the flash interval, the photocell in and of itself effectively integrates the incident light, converting that incident light into a voltage signal of increasing magnitude appearing at the slider 18.

This signal of increasing magnitude is applied to the amplifier transistor 22, thence to the control electrode of the unijunction transistor 24. When the signal at the control electrode of the unijunction 24 has reached a predetermined and fixed breakdown voltage, the unijunction transistor becomes suddenly conductive, producing a sharp pulse of energy to the control electrode of a silicon control rectifier 26 causes that rectifier to become suddenly conductive, effectively short circuiting the resistor 32. This, in turn, causes the capacitor 36 to discharge, hereby applying a sharp pulse of energy to the primary winding of the trigger transformer 38. The transformer 38 transmits the triggering pulse through the capacitor 40 to the triggering electrode 46 of the quench tube 42. That triggering pulse causes the quench tube 42 to become instantaneously conductive. Since the quench tube 42 has a much lower impedance, when conductive, than does the main flash tube, almost all of the remaining stored energy in the storage capacitor 6 is discharged through the quench tube 42, causing the main flash tube 2 to be extinguished at such time as sufficient light has been reflected onto the photocell 12 to effect the initiation of the quenching.

The slidewire 14 together with the slider 18 acting thereupon comprises means for adjusting the sensitivity of the system to correspond to the sensitivity of the various available films and the lens aperture on the camera. For convenience, the means for adjusting the slider 18 manually may be calibrated directly in terms of A.S.A. film speed ratings and f/numbers.

Since the unijunction transistor 24 and the silicon controlled rectifier 26 are both of so-called controlled trigger type semi-conductors, it might seem that the use of both devices would be superfluous, and in some instances it might even be so. However, the triggering characteristics of the unijunction transistor are much more accurately controllable than are those of the silicon controlled rectifier. The silicon controlled rectifier is used as the main switch because of its power handling capabilities. The capacitor 40 in the triggering circuit of the quench tube is included to preclude the establishment of a discharge path in the trigger electrode circuit of the quench tube.

As was previously noted the decay time characteristic of the photocell is long with respect to the normal flash interval of the flash tube. On the other hand, however, for other considerations the response time is relatively short. It is this characteristic of the semiconductor photocells that enable them to be used in the present invention as a light integrator for the light from the flash tube. Further, because of this characteristic it is not necessary to provide shutter or switch means for excluding ambient light effects from the presence of the photocell. For ambient or persistent light conditions, the photocell does not continue to integrate but stabilizes at some value representative of the ambient light. Since the quench control circuit is capacity coupled throughout, the signal representative of the ambient light is not transmitted to the control electrode of the quench tube; only the pulse of energy representative of the quantity of the light reflected from the flash is applied to the control circuit.

Although the signal representative of the ambient light is not directly reflected into the quench control circuit, there is a possibility of a secondary effect which, unless controlled, could produce an error in the control circuit. This secondary effect is in the nature of a variation in the response characteristic of the photocell to a given pulse of light under different conditions of ambient or persistent light. For example, if the voltage pulse produced by the detecting circuit as a result of the incidence of a given pulse of light is of a higher magnitude at greater ambient light than at a lower ambient light, this increasing ratio obtains up to some maximum value. In some applications for simplicity purposes it is desirable to keep the voltage pulse constant and independent of the ambient light. As an example, when high levels of flash illumination are used the ambient illumination contributes a negligible amount to the correct camera exposure. Thus the quench control circuit should respond only to the flash illumination and not be affected by ambient illumination. In other applications it may be desirable to have the voltage pulse be affected by ambient so that the quench control circuit responds to ambient light and the flash illumination. As an example, at low levels of flash illumination the ambient illumination can contribute a substantial portion of the correct camera exposure. Thus, it would be desirable for the quench control circuit to measure both the ambient and the flash illumination to provide the correct exposure. In order to provide either desired operation, the slope of the response curve of the photocell should be matched to the desired exposure curve.

Figure 2:
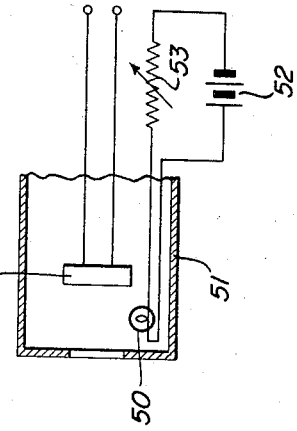
FIG. 2 is a pictorial representation of an ambient light compensating means for the circuit shown in FIG. 1.

A proposed way of controlling this effect is to provide a small light source of constant or variable value within the housing for the apparatus and to which the photocell is exposed as shown in FIG. 2. A small incandescent bulb 50 is mounted within a housing 51 for the photocell 12. The light from the bulb 50 is arranged to illuminate the photocell 12. A battery 52 and a variable resistor 53 are provided for the purpose of adjusting the compensating light from the bulb 50. The amount of illumination from the bulb 50 will determine the slope of the response curve of the photocell 12. The change in response with ambient by the photocell 12 can be decreased by increasing the illumination from the bulb 50. By setting the illumination from the bulb 50 high enough, the photocell response will be independent of ambient light. By setting the illumination from the bulb 50 at some lower value, the photocell 12 response can be adjusted to provide the desired response to ambient as well as flash illumination. Since the change in exposure as a function of ambient is, also, a function of the camera shutter speed, the illumination from the bulb 50 may be adjusted for each shutter speed used, with a faster shutter speed calling for a higher value of bulb illumination to make the cell less sensitive to the external ambient light. On the other hand, the illumination may be adjusted at shutter speed intermediate the shutter speed range available to provide a desired overall modification of the integrated response to compensate the effect of external ambient light on the quench control circuit response. It is evident that a fixed resistor of some predetermined value may be substituted for the variable resistor 53.

Thus it may be seen that there has been provided in accordance with the present invention an improved automatic flash exposure control apparatus for controlling the light energy produced by an electronic flash source which is characterized in that time duration of the flash produced by the flash unit is compensated in accordance with the effect of ambient light on the flash exposure control apparatus.

Subject matter disclosed but not claimed herein is disclosed and claimed in my copending application Ser. No. 393,310, filed on Aug. 31, 1964.

What is claimed is:

In an electronic flash apparatus wherein an electrical charge stored on a capacitor is selectively discharged through a flash tube, a flash control means comprising a light sensitive circuit means responsive to incident light energy derived from said flash tube and ambient light, said circuit means including a semi-conductor photocell exposed to said light energy and having a response characteristic with respect thereto which is affected by said ambient light, said photocell alone constituting a substantially non-reactive light integrator arranged to integrate said incident light and to produce an output signal representative of such integration, a response controlling source of light energy arranged to illuminate said photocell, adjustable means for varying the intensity of said light energy from said source, thereby to permit the adjustment of the effect which said ambient light produces on said response characteristic of said photocell, trigger circuit means connected to said photocell and responsive to said output signal to produce a trigger pulse when said output signal reaches a predetermined value, switch circuit means including an electronic switch element arranged to be rendered conductive upon the application of a trigger pulse thereto, means connecting said trigger circuit means to said switch circuit means to control the operation thereof, and means connecting said switch element in shunt with said flash tube to short-circuit the latter when said switch element is rendered conductive.

References Cited

UNITED STATES PATENTS

| Re. 19,199 | 6/1934 | Knowles | 315—159 X |
| 2,386,320 | 9/1945 | Kott | 315—151 |
| 3,033,988 | 5/1962 | Edgerton | 315—151 X |

DAVID J. GALVIN, *Primary Examiner.*